United States Patent
Diezinger et al.

(10) Patent No.: US 7,722,689 B2
(45) Date of Patent: May 25, 2010

(54) DEVICE FOR SUPPLYING FUEL TO A BURNER IN A FUEL CELL SYSTEM COMPRISING A REFORMER

(75) Inventors: Stefan Diezinger, Nürnberg (DE); Arnold Lamm, Eichingen (DE); Gert Hinsenkamp, Kirchheim (DE); Jochen Schäfer, Ulm (DE); Marc Sommer, Ulm (DE); Dimosthenis Trimis, Fürth (DE)

(73) Assignee: Airbus Deutschland GmbH, Hamburg (DE)

( * ) Notice: Subject to any disclaimer, the term of this patent is extended or adjusted under 35 U.S.C. 154(b) by 855 days.

(21) Appl. No.: 10/970,677

(22) Filed: Oct. 21, 2004

(65) Prior Publication Data
US 2005/0126075 A1    Jun. 16, 2005

(30) Foreign Application Priority Data
Oct. 22, 2003    (DE)    ................. 103 49 075

(51) Int. Cl.
*B01J 8/00* (2006.01)
*F01N 3/20* (2006.01)
*C01B 3/02* (2006.01)

(52) U.S. Cl. ............... 48/127.9; 422/105; 422/107; 423/64; 423/648.1

(58) Field of Classification Search ........... 48/127.9; 422/105, 107; 423/644, 648.1
See application file for complete search history.

(56) References Cited

U.S. PATENT DOCUMENTS

| | | | | |
|---|---|---|---|---|
| 4,838,897 A | * | 6/1989 | Amano et al. | ............ 48/127.9 |
| 5,199,866 A | * | 4/1993 | Joshi et al. | ................. 431/353 |
| 5,251,823 A | * | 10/1993 | Joshi et al. | ................. 239/401 |
| 6,045,933 A | * | 4/2000 | Okamoto | ..................... 429/17 |
| 6,299,994 B1 | * | 10/2001 | Towler et al. | ................ 429/17 |
| 6,472,092 B1 | * | 10/2002 | Matsuda et al. | .............. 429/17 |
| 6,902,840 B2 | * | 6/2005 | Blanchet et al. | ............. 429/34 |
| 6,921,595 B2 | * | 7/2005 | Clawson et al. | .............. 429/17 |
| 6,991,183 B2 | * | 1/2006 | Nau et al. | ................... 239/290 |
| 7,374,591 B2 | * | 5/2008 | Sommer et al. | ............ 48/198.7 |
| 2002/0058166 A1 | * | 5/2002 | Boneberg et al. | ............ 429/13 |
| 2003/0022950 A1 | * | 1/2003 | Keppeler | ................... 518/726 |

(Continued)

FOREIGN PATENT DOCUMENTS

DE    19951585 C2    5/2001

(Continued)

OTHER PUBLICATIONS

English translation of JP 60-065472 Abstract.*

(Continued)

*Primary Examiner*—Walter D Griffin
*Assistant Examiner*—Natasha Young
(74) *Attorney, Agent, or Firm*—Ingrassia Fisher & Lorenz, P.C.

(57) ABSTRACT

A device is used for supplying fuel to a burner in a fuel cell system with a reformer. The fuel comprises a materials flow of a reformate gas, which materials flow is depleted of hydrogen, and a materials flow of a compound which comprises carbon and hydrogen. According to the invention, the device comprises at least one nozzle means in which the two materials flows can be mixed together. At least one of the materials flows is controllable as far as its through-flow is concerned.

13 Claims, 2 Drawing Sheets

U.S. PATENT DOCUMENTS

2003/0200699 A1* 10/2003 Robb .................. 48/198.7
2004/0191131 A1* 9/2004 Wolf et al. .............. 422/129

FOREIGN PATENT DOCUMENTS

| DE | 100 54 842 A1 | | 8/2002 |
|---|---|---|---|
| EP | 1705739 A2 | | 9/2006 |
| JP | 60065472 A | * | 4/1985 |
| WO | WO96/41948 | * | 12/1996 |

OTHER PUBLICATIONS

English translation of JP 60-065472.*

* cited by examiner

DEVICE FOR SUPPLYING FUEL TO A BURNER IN A FUEL CELL SYSTEM COMPRISING A REFORMER

CROSS-REFERENCES TO RELATED APPLICATIONS

This application claims the priority of German Patent Application, Serial No. 103 49 075.2, filed Oct. 22, 2003, pursuant to 35 U.S.C. 119(a)-(d), the disclosure of which is incorporated herein by reference.

BACKGROUND OF THE INVENTION

The present invention relates to a device for supplying fuel to a burner in a fuel cell system comprising a reformer.

Nothing in the following discussion of the state of the art is to be construed as an admission of prior art.

Burners or combustion chambers are used in fuel cell systems with reformers for combusting burners residual gases and generating thermal energy for the fuel cell system. Typically, such residual gases can be the exhaust gases of the fuel cell, to which residual gases, if need be, an additional combustible starting material is fed, in particular the same starting material as is fed to the reformer. Usually a liquid starting material which comprises carbon and hydrogen, such as e.g. petrol, diesel, naphtha, an alcohol or the like, is used as a starting material. A typical design of the type mentioned above is for example described in German patent publication DE 100 54 842 A1.

In order to ensure the best possible combustion in the burner, the starting material, provided such starting material is being added, is conveyed and atomised and/or evaporated in the mixture made up of air and residual gas.

Apparatus-related as well as energy-related expenditure may be necessary in order to achieve this.

Handling the resulting mixture of residual gas, residual air from the cathode region, and if applicable, of the starting material may be comparatively critical when compared to the pure starting material and/or the residual gas; said mixture can prematurely combust or it can also explode.

It would therefore be desirable and advantageous to provide an improved device for supplying fuels to a burner, to obviate prior art shortcomings and to operate at optimum energy use and safety.

SUMMARY OF THE INVENTION

According to one aspect of the present invention, a device for supplying fuel to a burner in a fuel cell system, includes a reformer, wherein the fuel comprises a materials flow of a reformate gas, which materials flow is depleted of hydrogen, and a materials flow of a compound which comprises carbon and hydrogen; and at least one nozzle for mixing the two materials flows, wherein at least one of the materials flows is controllable as far as its through-flow is concerned.

In this arrangement the nozzle means of the device according to the invention can be a regulatable dual-fuel nozzle. In the dual-fuel nozzle, mixing of the two materials flows occurs, namely from the materials flow of a reformate gas whose hydrogen content has been depleted, i.e. of a retentate gas flow, and from a materials flow which comprises carbon and hydrogen, i.e. a starting material flow which can e.g. be used for combustion, but in particular also for reforming.

Apart from this, because of the controllability of at least one of the materials flows concerning its through-flow, the nozzle means of the device according to the invention can also be used as a pressure controlling valve and pressure maintaining valve. For, typically, in the region of the suppliers of the residual gas, e.g. in an anode space of a fuel cell or in a retentate region of a hydrogen separation module, based on membranes which are selectively permeable to hydrogen, there is a clear increase in pressure when compared to the pressure in the region of the burner, with the latter usually being operated only slightly above ambient pressure. As a result of the nozzle means, this increased pressure may thus be kept in the region of the suppliers of the retentate gas flow.

Furthermore, at least part of the energy which arises during pressure reduction to the pressure level of the burner may be used in the above-mentioned sense for conveying, atomising and/or vaporising the starting material. This may obviate the need for a dedicated conveying device and an atomising device.

It is believed that there is a further advantage in that by integrating the activities of mixing and pressure maintenance in one component, design space and components can be saved. In particular in the case of small, light and compact applications such as e.g. in the case of a fuel cell system comprising a reformer, which fuel cell system is to be used as an auxiliary power unit (APU) in a vehicle, a yacht or an aircraft, this may result in advantages concerning not only design space but also costs.

According to another feature of the present invention, precisely one of the materials flows may be controllable as far as its through-flow is concerned.

Since the two materials flows directly influence each other, typically, controlling a single materials flow may be sufficient to implement controllability in the sense desired according to the invention. Thus, controllability and pressure maintenance may be implemented with minimal apparatus-related expenditure, namely with a single control device for one of the two materials flows.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
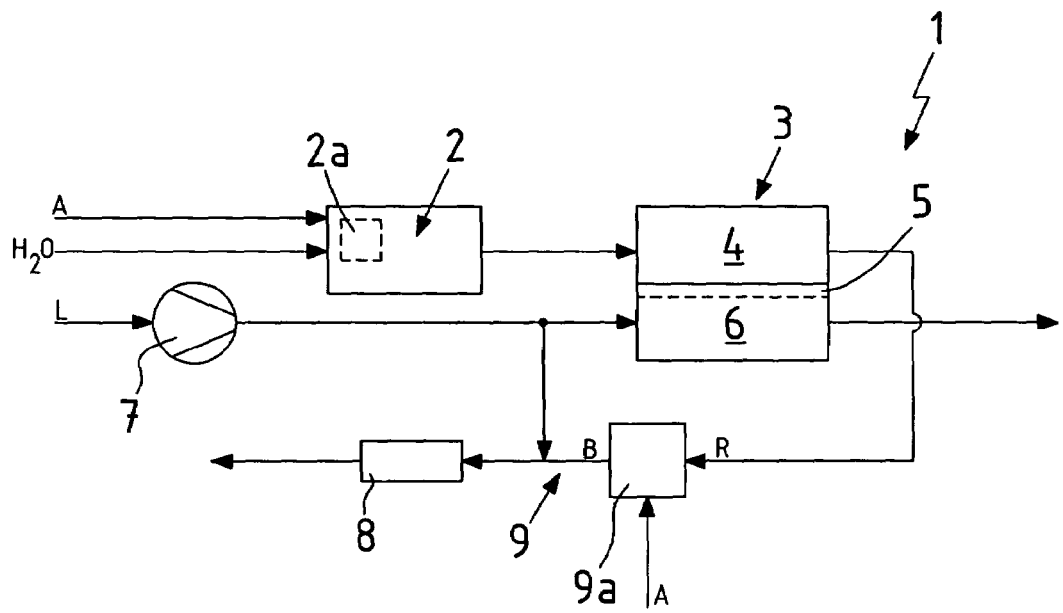
FIG. 1 is a diagrammatic elementary diagram of a first embodiment of a fuel cell system.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a diagrammatic elementary diagram of a first embodiment of a fuel cell system, generally designated by reference numeral 1, in which in a gas generation system 2 from a starting material comprising carbon and hydrogen, a hydrogen-containing gas for operating a fuel cell 3 is produced. For this purpose the gas generation system 2 comprises at least one reformer 2a, which can for example be a steam reformer or an autothermic reformer. Apart from this reformer 2a, further components (not shown), for example water gas shift stages, gas purifying devices or the like, can be provided in the gas generation system 2.

In the embodiment according to FIG. 1, the reformate which flows from the gas generation system 2 and which contains hydrogen then directly reaches the region of the fuel cell 3 and in this region in particular its anode space 4. In the selected example of a PEM fuel cell 3, this anode space 4 is separated by a membrane 5 from a cathode space 6 of the fuel cell 3 in a way which is known per se. In a way which is also known, oxygen or air as an oxygen-containing medium is fed to the cathode space 6 by way of an oxidation agent, with said oxygen or air for example being conveyed into the region of the cathode space 6 by a compressor 7.

After this, the fuel cell 3 generates electrical energy, as well as water as a by-product, from said two media which are located in the region of the anode space 4 and the cathode space 6 of said fuel cell 3.

After this, the media flows from the region of the anode space 4 and the cathode space 6, which media flows are depleted of hydrogen and oxygen, leave the fuel cell 3. The exhaust gas flow from the region of the cathode space 6 can for example, as shown in the drawing, be released to the environment, either directly or by way of suitable equipment for recovering thermal energy and/or pressure energy. However, the exhaust gas flow from the region of the anode space 4 still contains some combustible residual materials, so that this residual gas flow R cannot or should not be directly released into the environment.

Instead, the residual gas flow R is fed to a burner 8 in which thermal energy is generated as a result of combustion of said residual gas R.

In this arrangement, the thermal energy from the burner 8 can be used in the fuel cell system 1 in a multitude of ways which are known per se. For example, said thermal energy can be utilised for heating components in the region of the gas generation system 2, in particular for heating a steam reformer, in cases where the reformer 2a is designed as such a steam reformer. Furthermore, the hot exhaust gases from the region of the burner 3 can also be used for driving a suitable hot gas turbine which can generate not only electrical energy but also mechanical energy. The energy generated in such a way can for example be used towards driving the compressor 7.

Since in many applications the materials contained in the residual gas stream R do not provide a sufficient amount of thermal energy when combusted in the burner 8, the addition of a further combustible material can be provided for.

Typically, the starting material A, which also contains the carbon and hydrogen which are used for gas generation in the gas generation system 2, will be used as an additionally supplied combustible material. This results in only one feed tank and one feed line to the fuel cell system 1 being required. In the fuel cell system 1 shown, this starting material A among other things is mixed, in the region of a device 9 by way of a nozzle means 9a, with the residual gas flow R to form a fuel for the burner 8. As is shown in the embodiment shown, air L is admixed to this fuel from the region of the nozzle means 9a only between the nozzle means 9a and the burner 8, wherein said air L can for example originate directly from the region of the compressor 7, and wherein said air L is thus heated as a result of the energy used in the compression process. This mixture of the fuel generated in the nozzle means 9a and of the air L which has been preheated in the course of the compression process, or which air L if applicable has been preheated by a heat exchanger (not shown) through which hot exhaust gases from the burner 8 flow, then makes it possible to achieve very good combustion of the contents in the burner 8, which burner 8 can for example be a pore burner.

Since neither the flow of residual gas R nor the starting material A has a corresponding oxygen content, premature ignition and/or explosion of the mixture can safely be prevented because it is only when the preheated air L is added that a combustible mixture arises, which combustible mixture is then directly converted in the burner 8.

Figure 2:
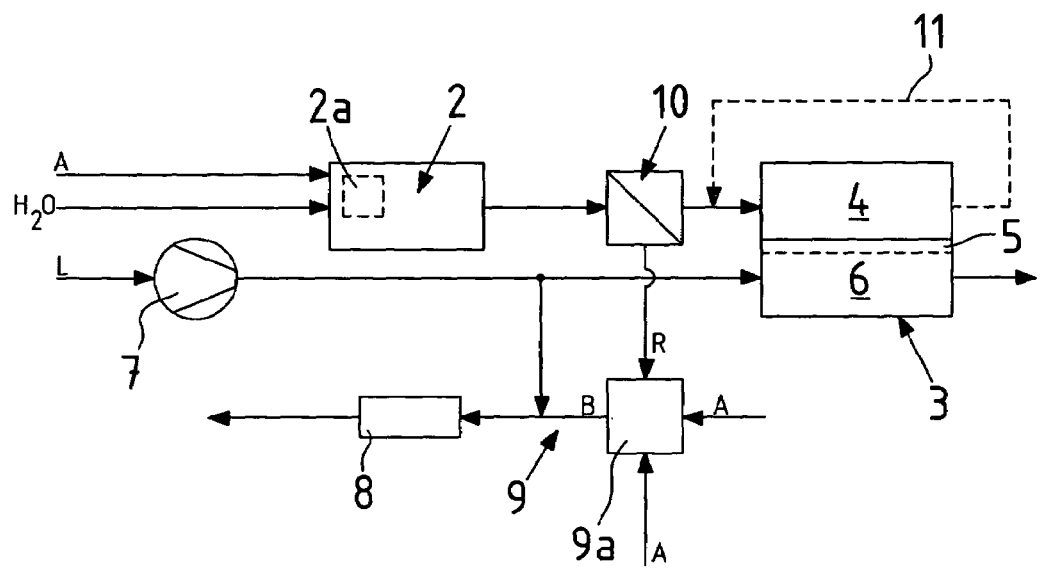
FIG. 2 is a diagrammatic elementary diagram of another embodiment of a fuel cell system.

The design according to FIG. 2 is to a large extent comparable to that according to FIG. 1, with the same reference characters being used for identical components.

Below, a brief explanation only of two differences in the design of the fuel cell systems 1 shown in FIG. 1 and FIG. 2 is provided.

A first difference in the fuel cell system 1 according to FIG. 2 concerns the type of purification of the reformate gas flow which contains hydrogen and which emanates from the gas generation system 2. This reformate gas flow is not fed directly to the fuel cell 3, but instead it first goes through a so-called hydrogen separation module or membrane module 10. In this membrane module 10, membranes are provided which are selectively permeable to hydrogen, for example membranes based on palladium alloys or the like, wherein said membranes separate the reformate gas flow into almost pure hydrogen, which is fed to the fuel cell 3, and into a reformate gas flow which is depleted of hydrogen, the so-called retentate. This retentate is then fed as a residual gas flow R to the above-mentioned nozzle means 9a of the device 9, where together with further starting material A, said retentate provides the fuel for the burner 8. The almost pure hydrogen can be practically completely converted in the anode space 4 of the fuel cell 3. For this reason the anode space 4 is operated for example in so-called dead-end operation—or preferably with return of the non-converted hydrogen, a so-called anode loop 11, as optionally indicated in the drawing.

Irrespective as to whether the residual gas flow R originates from the region of the anode space 4 of the fuel cell 3 or from the retentate region of the hydrogen separation module 10, the device 9 must comprise the suitable nozzle means 9a in which the two materials flows, i.e. the residual gas flow R and the starting material flow A, are mixed together in a suitable way. According to the invention, the design of the nozzle means 9a must also make it possible to control the through-flow of at least one of the materials flows.

Figure 3:
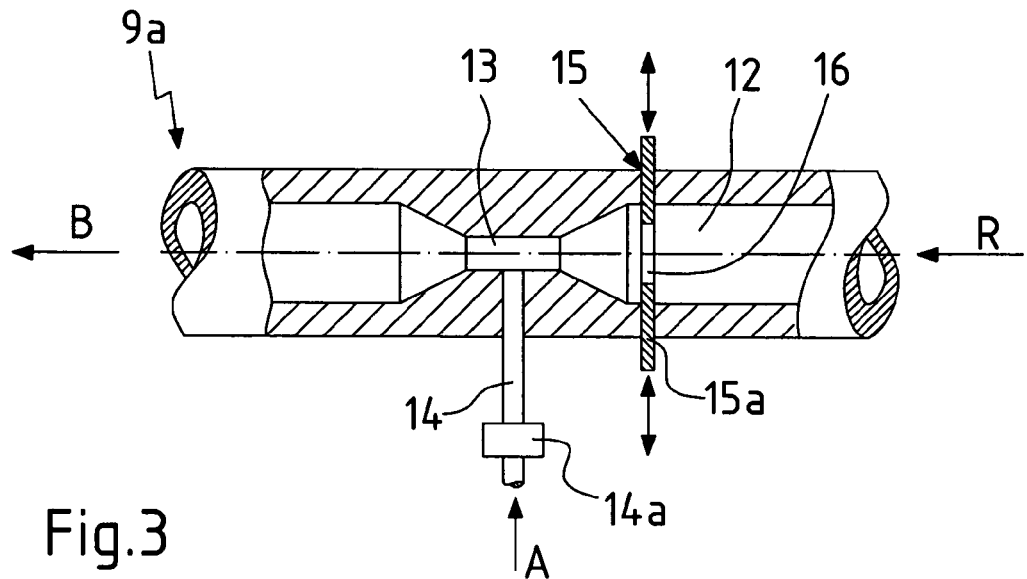
FIG. 3 is an elementary section view of a first variation of a nozzle means according to the invention.

FIG. 3 shows a first exemplary embodiment of such a nozzle means 9a. In this arrangement, the residual gas flow R flows to the nozzle means 9a as one of the two materials flows to be mixed together. The residual gas flow R then flows through a line region 13 whose cross section is reduced when compared to the cross section 12 in the materials flow flowing to the nozzle means 9a, so that negative pressure occurs in a way known per se, and as a result of said negative pressure the starting material A can be sucked in through a further line element 14 and can be atomised in the residual gas flow R. The mixture from the two materials flows R, A then flows as a fuel B from the region of the nozzle means 9a into the region of further means, not shown in the drawing, of the device 9, for mixing the fuel B with preheated air L.

Furthermore, the embodiment of the nozzle means 9a according to FIG. 3 provides for a mechanical means 15 for varying the cross section 12 through which the residual gas flow R can flow. In its embodiment according to FIG. 3, this mechanical means 15 is designed as a diaphragm 15a which is variable in its diameter. The diaphragm 15a can be moved in such a way that a cross section 16 in the region of the diaphragm 15a, through which cross section 16 material can flow, can be influenced as far as its outer circumference is concerned (as indicated on the drawing by the two double arrows). To this effect the diaphragm 15a can for example be an iris diaphragm or a diaphragm which incorporates the movement of a slide gate, both in a way which is known per se, in the region of the cross section 12 through which the residual gas stream R flows. It is also imaginable that the diaphragm 15a is a disc with variable-sized apertures, wherein said disc is rotated in the region of the cross section 12 through which the residual gas is flowing in such a way that said gas flow changes as required.

As an alternative or as a supplement to the controllability of the residual gas flow R, it is also possible to influence the starting material flow A, as far as the supplied quantity and pressure are concerned, by means of suitable final control elements, which in the drawing are indicated in an exemplary way by the reference character 14a. For example flow control valves, a mass flow regulator or if applicable a metering pump whose feed volume flow is controllable can be used as suitable final control elements 14a.

Figure 4:
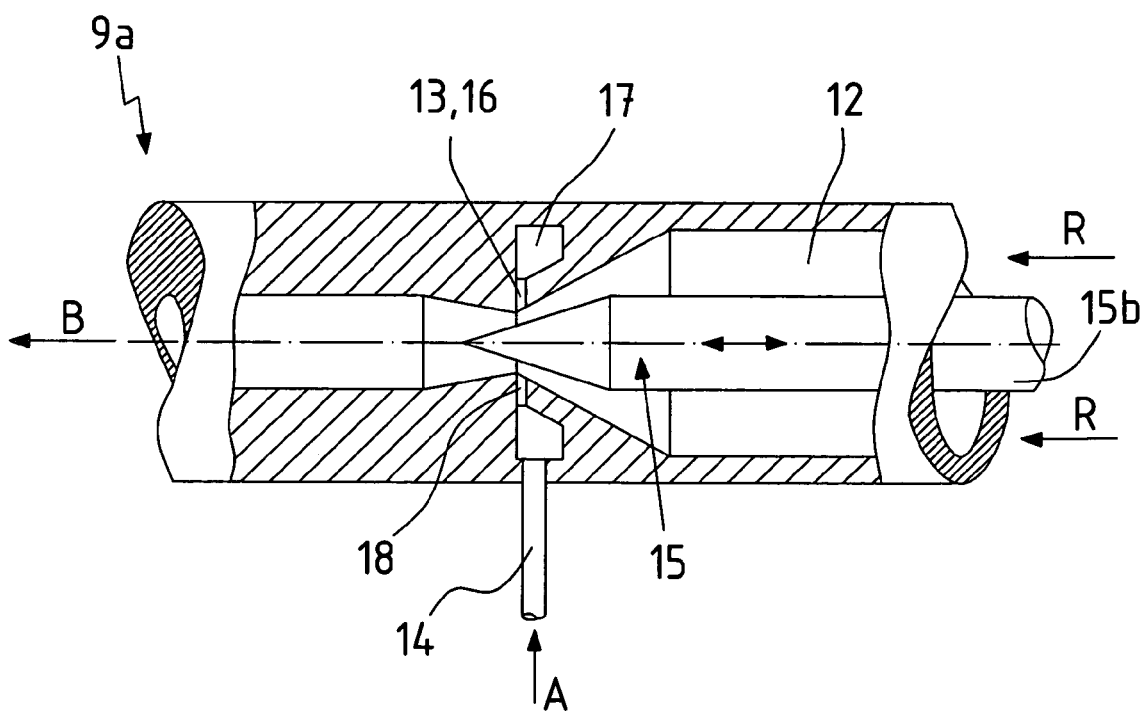
FIG. 4 is an elementary section view of a second variation of a nozzle means according to the invention.

FIG. 4 shows a further possible embodiment of the nozzle means 9a, in which a change in the cross section 12 through which the residual gas flows is influenced from the centre of the cross section by a needle. Said cross section 12 through which the residual gas flows is influenced by a needle 15b as a mechanical means 15, i.e. by a respective increase or decrease of an annular gap. This design is known in principle from the field of spray paint atomisers and the like and can for example be used in an analogous manner. In FIG. 4 too, sucking in and atomising the starting material A again takes place in the region of the narrowest cross section 13, which in this embodiment coincides with cross section 16 which can be changed by the needle 15b. As is shown in the drawing by way of an example, the starting material A can be supplied by way of an annular channel 17, which is connected to the region of the narrowest cross section 13 by way of one or several channels 18.

Such a nozzle means 9a can thus be used not only for conveying and atomising the starting material A but also for adjusting a controllable pressure loss in the residual gas flow R.

In the direction of flow downstream of the nozzle means 9a shown in the drawing, the device 9 again comprises means for mixing the fuel B with a medium that contains oxygen, in particular with preheated air L. Such means can thus be designed in a way known per se, and ideally can be arranged directly upstream of the burner. In this way, the distance of conveying the flammable or explosive mixture of fuel B and air L can be reduced in an ideal way so that no safety risks can arise when handling the mixture. Thus, in contrast to hitherto known designs, the fuel B, i.e. the starting material A and the residual gas R, is conveyed without the addition of air L or residual oxygen, for example from a cathode exhaust gas of the fuel cell 3 so that the system according to the invention involves clearly reduced lengths of lines which are filled with flammable or explosive mixtures.

Typically, the pressure loss is adjusted via the nozzle means 9a so that said nozzle means 9a can at the same time be used as a pressure maintaining valve for the region from which the residual gas R originates. With the use of an anode exhaust gas from the fuel cell 3, a pressure reduction of typically approx. 0.5 to 2 bar can be expected, while with the use of a residual gas R from the region of the hydrogen separation module 10, a pressure in the order of 5 to 15 bar upstream of the nozzle means 9a is maintained by said nozzle means 9a.

Of course, with the embodiment shown, it is imaginable that supplementary or alternative control of the starting material flow A is used by final control means 14a (not shown).

Due to the energy-saving, compact and safe function of such devices 9, their application is imaginable in all fuel cell systems 1. However, for the above-mentioned reasons, application in fuel cell systems 1 which are used as auxiliary power units (APUs) is particularly favourable.

Such auxiliary power units can be used as mobile fuel cell systems 1 in combination with a vehicle on land, in the water or in the air, or without such a vehicle.

The energy generated by such auxiliary power units can be used for various electrical consumers and electronic devices, e.g. consumer electronics, air conditioning units, vehicle electrics, accessory drives and the like.

Depending on the application, various starting materials A can be used, for example petrol, naphtha, diesel, kerosene, alcohols or the like. The typical use of the device 9 is described together with a fuel cell 3 which is a PEM fuel cell, which normally is a stack of fuel cells, which stack comprises a multitude of individual cells. The device is however not limited to this type of fuel cell 3.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for supplying fuel to a burner in a fuel cell system, comprising: a reformer for producing a reformate gas which is then depleted of hydrogen, wherein the hydrogen depleted reformate gas is a first materials flow; at least one nozzle receiving the first materials flow and constructed to draw in a second materials flow, wherein the second materials flow is a materials flow of a starting material for reforming that comprises carbon and hydrogen, for mixture with the hydrogen depleted reformate gas to produce fuel for direct transfer into the burner; and an adjustment means for controlling a flow of at least one of the first and second materials flows through the nozzle, thereby allowing control of a mixing ratio between the first and the second materials flows.

2. The device of claim 1, wherein precisely one of the first and second materials flows has a through-flow rate that is controllable.

3. The device of claim 1, wherein the first materials flow is an exhaust gas flow from a region of an anode space of a fuel cell.

4. The device of claim 1, wherein the first materials flow is a retentate gas flow from a region of a hydrogen separation module based on membranes which are selectively permeable to hydrogen.

5. The device of claim 1, wherein a volume flow of the first materials flow is controllable.

6. The device of claim 1, wherein the volume flow of the staffing material is controllable.

7. The device of claim 1, wherein the at least one nozzle is arranged such that he second materials flow is conveyed and atomised by the first materials flow.

8. The device of claim 1, wherein a region of the at least one nozzle, a controllable pressure loss occurs as a result of the controllability of one of the first and second materials flow.

9. The device of claim 1, wherein the adjustment means is a mechanical device arranged in the region of the at least one nozzle and having a variable cross section through which material can flow.

10. The device of claim 9, wherein the mechanical device is arranged such that the variable cross section through which material can flow is changeable from its centre.

11. The device of claim 9, wherein the mechanical device is arranged such that the variable cross section through which material can flow is changeable from its circumference.

12. The device of claim 2, wherein the first materials flow is an exhaust gas flow from a region of an anode space of a fuel cell.

13. The device of claim 2, wherein the first materials flow is a retentate gas flow from a region of a hydrogen separation module based on membranes which are selectively permeable to hydrogen.

* * * * *